United States Patent [19]

Gilb

[11] 4,261,155
[45] Apr. 14, 1981

[54] INFINITE SKEWED HANGER
[75] Inventor: Tyrell T. Gilb, Berkeley, Calif.
[73] Assignee: Simpson Manufacturing Co., Inc., San Leandro, Calif.
[21] Appl. No.: 94,706
[22] Filed: Nov. 16, 1979
[51] Int. Cl.³ .............................................. E04C 5/00
[52] U.S. Cl. .................................... 52/702; 248/282; 248/289.1; 403/232.1
[58] Field of Search ............... 52/702, 713; 403/232.1, 403/230, 187, 65; 248/289 R, 289 A, 290, 122, 282, 283

[56] References Cited
U.S. PATENT DOCUMENTS

| | | | |
|---|---|---|---|
| 1,936,813 | 11/1933 | West | 248/282 |
| 2,849,205 | 8/1958 | Chapin | 248/282 |
| 2,951,670 | 9/1960 | Aberer | 248/289 |
| 3,423,898 | 1/1969 | Tracy | 52/702 |
| 4,158,940 | 6/1979 | Lancelot | 52/702 |

Primary Examiner—John E. Murtagh
Attorney, Agent, or Firm—James R. Cypher

[57] ABSTRACT

An infinite skewed and sloped sheet metal hanger for holding a supported structure to a supporting structure. The hanger consists of a supporting member which is connected to the supporting structure, a pin and a supported gusset-like member. Load shear is carried to the face support; not through the pivot connecting pin. This is accomplished by closely holding tab members with the supported gusset-like member.

16 Claims, 19 Drawing Figures

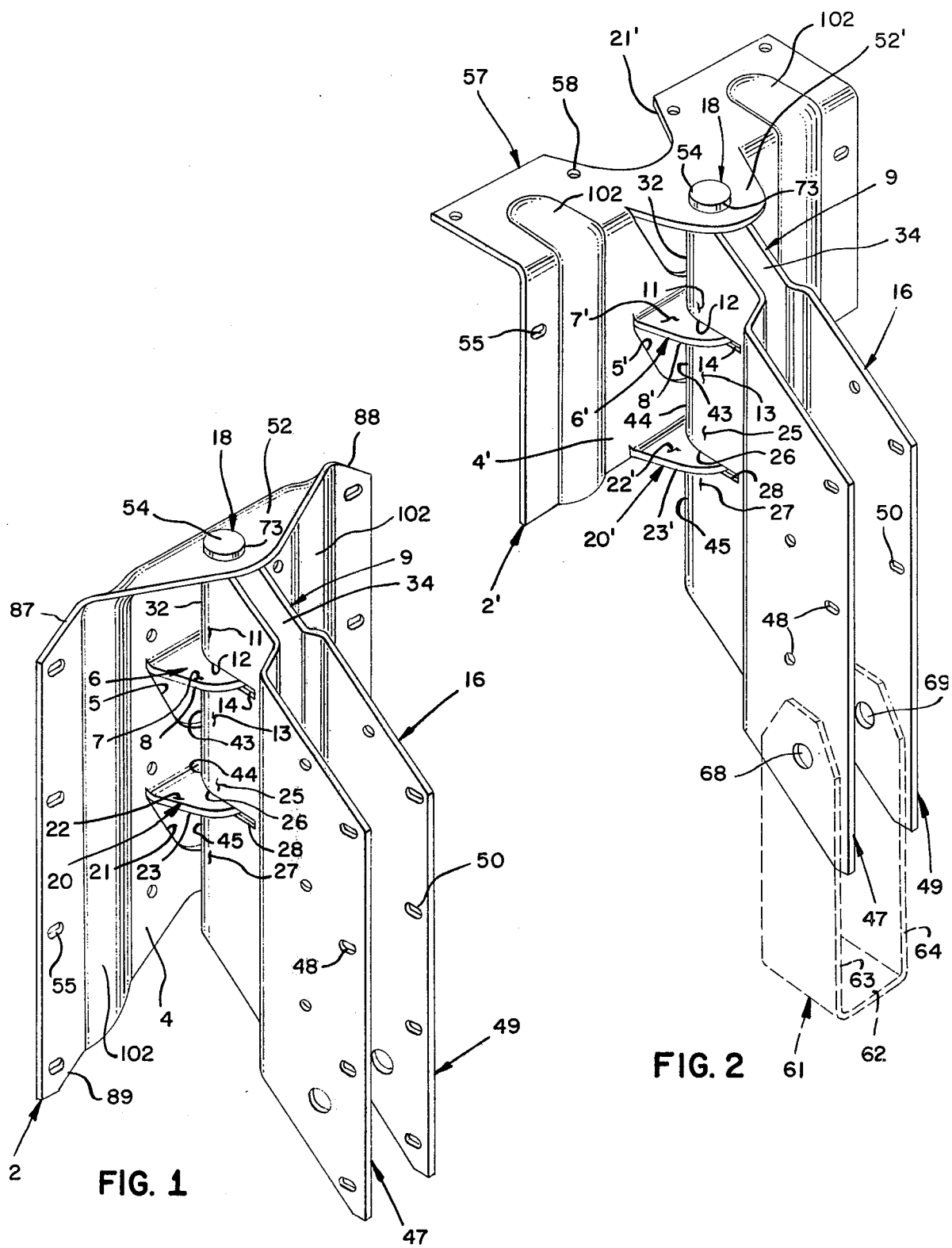

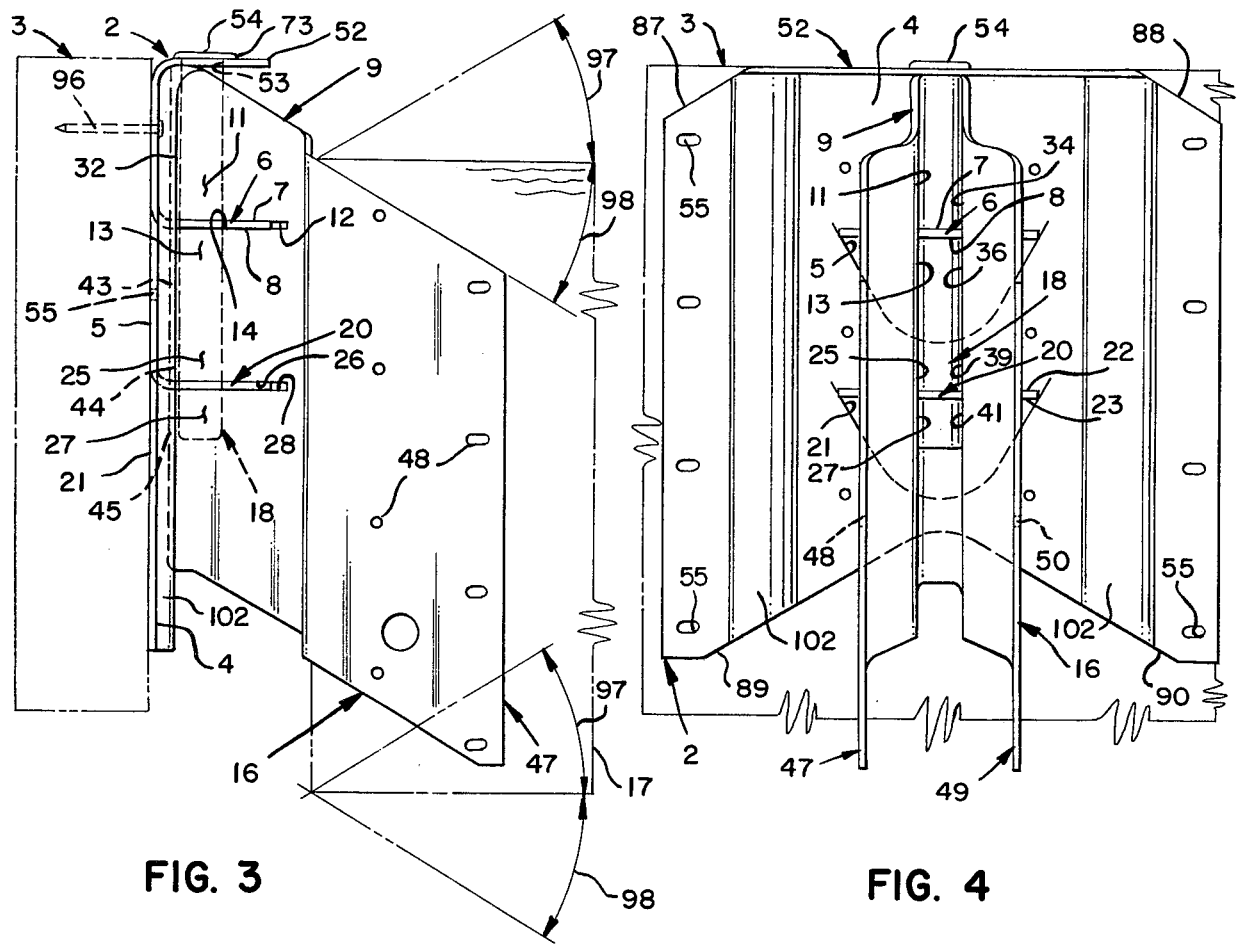
FIG. 3
FIG. 4
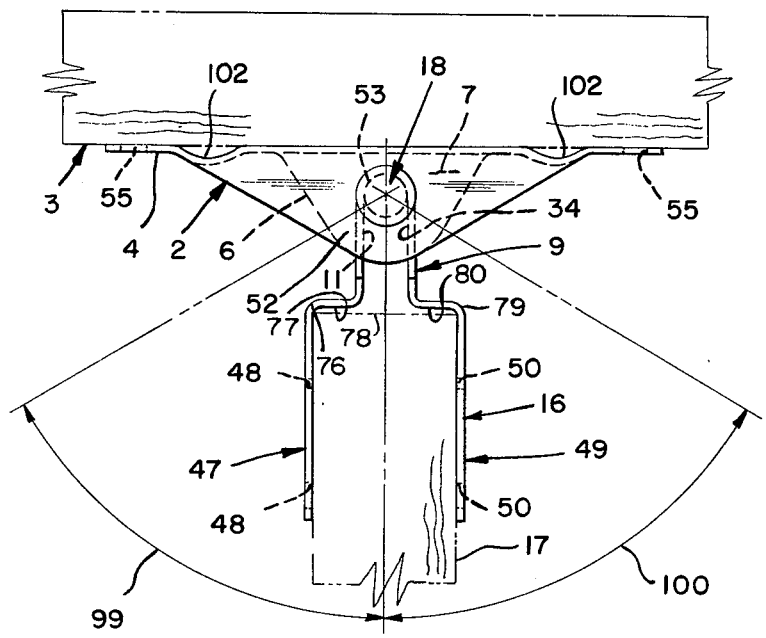
FIG. 5

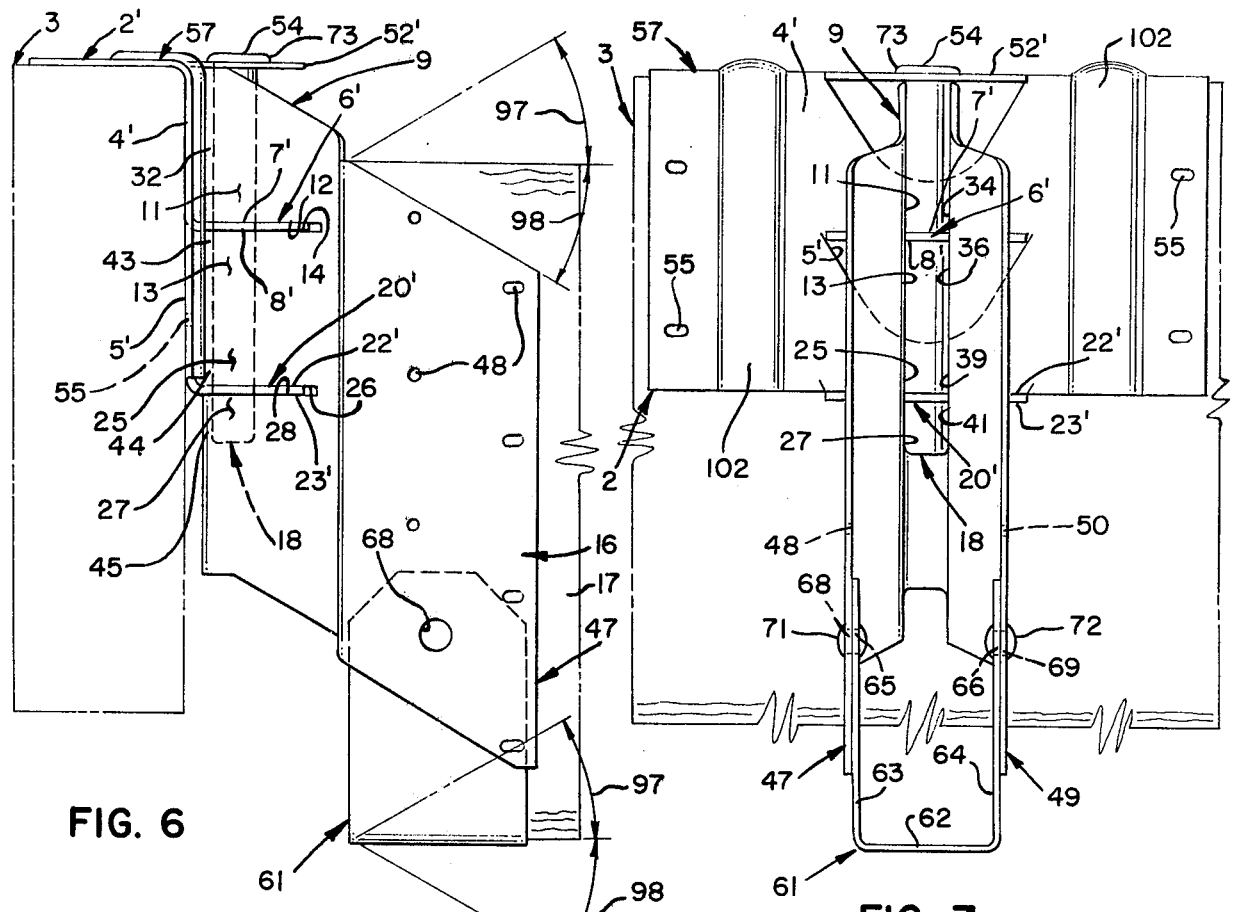
FIG. 6
FIG. 7
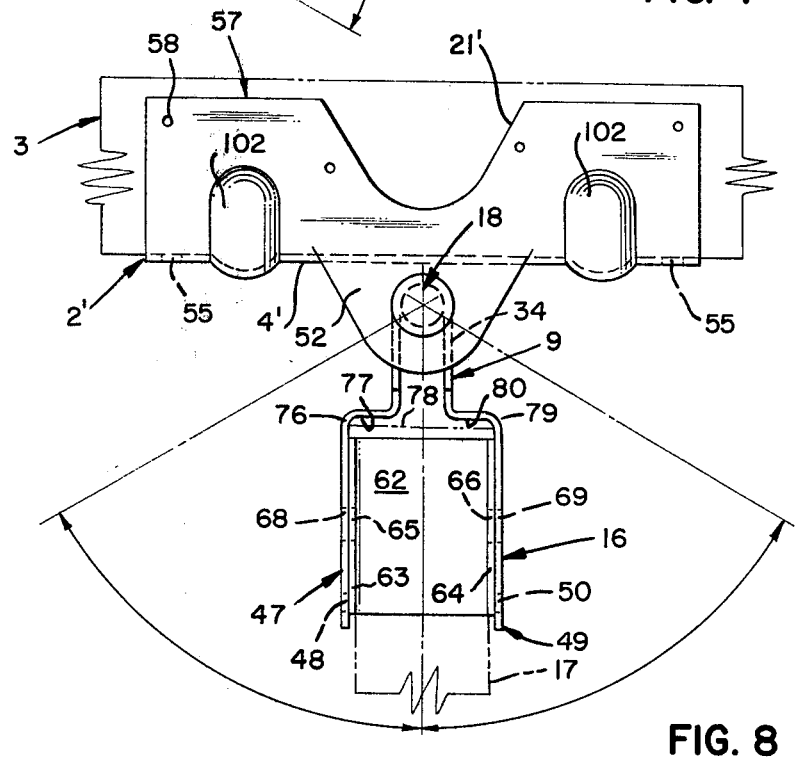
FIG. 8

INFINITE SKEWED HANGER

BACKGROUND OF THE INVENTION

This invention relates to sheet metal connectors used in the construction of wood frame buildings. Specifically, the invention is a hanger intended to provide for any known intersection requirement to any amount of skew and any amount of slope.

The sheet metal connector industry is a multi-million dollar business with hundreds of designers furnishing connectors for almost every conceivable intersection requirement. While the use of sheet metal connectors grew from modest beginnings prior to World War II, almost every building constructed today contains anywhere from a few dozen to hundreds of connectors.

In spite of the employment of a great many people over many years in this field not a single production sheet metal universal skewed and sloped hanger is known to Applicant. Applicant has been in the construction industry for many years and has known of the need for such a hanger. Despite his efforts to find a solution, the key eluded him to the present time even though he holds several patents on sheet metal connectors and has designed many non-patented connectors in this field.

Because there is no universal skewed and sloped hanger available, architects and builders are forced to design and build as few skewed and sloped intersections into their buildings as possible in order to keep the costs to a minimum. This lack of an inexpensive universal hanger has resulted in many compromises in design and the poor utilization of building lots which would be much more efficiently used if the entire building or portions thereof could be designed with intersections other than ninety degrees (90°).

Tracy, U.S. Pat. No. 3,596,941 is a connector capable of being custom formed on the construction site for fixed skew and slope angles. Once the connector is bent, however, it is impractical to use the connector at another angle. Hand bending of the connector would be slow and costly.

Applicant has filed an application, Gilb, Restricted Slot Nail Openings for Sheet Metal Framing Connectors U.S. Ser. No. 084,722 filed Oct. 15, 1979 for a device commonly referred to as a skewed hanger, but the subject hanger is formed at the factory at a fixed angle and cannot be used for intersections of different angles.

Lancelot, U.S. Pat. No. 4,124,962 granted Nov. 14, 1978 disclosed a joist hanger with an adjustable height seat. FIG. 10 of this patent discloses a device which permits the seat to be pivoted about a threaded bolt which is held by two cast lugs 45 and 46. Lancelot, supra holds the seat at a distance from the face of the supporting member in a way that the device must be capable of withstanding huge moment forces rather than holding the load in shear. Because the device must withstand moment forces rather than shear stress, Lancelot, supra must be constructed of heavy materials and is intolerably expensive for general usage in wood frame buildings.

The present state of the art requires that custom made skewed and/or sloped hangers be constructed where intersections are other than ninety degrees (90°). These custom made connectors require that the carpenter make a compound cut in the wood to receive the compound skew and slope angles. The high cost of the custom made connector as well as the additional labor required by skilled high cost labor combine to insure minimal use of such connectors.

It was obvious that a potential solution had to involve two separate parts, and that the support element had to rotate in respect to the supporting element in order to solve the basic requirement of the device. The analogy of the hinge or a hinge like solution proved to be an insidiously deceiving simile which masked the ultimate solution for nearly two decades even after dozens of concerted attempts to find the answer. Even though early feasibility studies indicated that a door hinge principle would lead nowhere since a door hinge capable of holding 1000 to 4,000 lbs. would have to be massive and require an expensive casting, still it seemed impossible to improve on this ancient and time honored device. Yet, only after the hinge principle was entirely cast aside was the solution discovered.

SUMMARY OF THE INVENTION

Careful observors of the sheet metal connector industry know that only devices capable of transferring loads by shear stresses are able to compete successfully in the market. The present device meets this criteria. Further, this device utilizes the simplest principles known to the engineer; namely the triangle. In its simplest embodiment, the triangle in the building industry is sometimes referred to as a gusset. While gussets do not normally rotate, and the use of a gusset principle appears to be historically contradictory, yet, the present device is in fact a moveable gusset-like device.

The present device provides an essentially rigid transfer to forces between the supporting and supported elements by the use of shear stresses at any horizontal angle that the axis of the supported member may describe in relationship to the face of the supporting member.

The discovered principle works with a minimum of one outstanding tab from one member and a gusset-like enclosure in the other member; secured by a pin which is not critical to the load carrying ability of the device but simply a practical element to connect the two primary elements of the device.

The universal skewed and sloped hanger of the present invention meets the following objectives:

1. Provides a hanger-like connection between a supporting member (beam) and a supported member (joist) so that the joist, in respect to the beam describes an angle of up to about sixty degrees (60°) in either direction from the perpendicular to the beam.

2. Provides a device for holding the joist in respect to the beam at an angle above and below a horizontal line by variable means utilizing either a seat principle or a nailed flange principle.

3. Provides a device which can be attached to a sloping beam.

4. Accomplishes the preceeding objectives at a cost less than equivalent custom made connectors for a particular size and application.

5. The device is testible at the maximum points of adjustment to provide uniform building code (ICBO) approval for rated loads with the standard 3X safety factor.

6. The device can be readily installed by the trades (usually carpentry).

7. The device can be made by existing production line methods using standard tooling such as progressive dies and utilizing standard gauge material.

BRIEF DESCRIPTION OF THE DRAWINGS

FIG. 1 is a perspective view of one form of the invention.

FIG. 2 is a perspective view of another form of the invention.

FIG. 3 is a side view of the invention shown in FIG. 1 in combination with a supporting structure and a supported structure.

FIG. 4 is a front view of the invention shown in FIGS. 1 and 3 with the supported structure omitted.

FIG. 5 is a top plan view of the invention set forth in FIGS. 1, 3 and 4.

FIG. 6 is a side view of the form of the invention set forth in FIG. 2 in combination with a supporting structure and a supported structure.

FIG. 7 is a front elevation view of the invention set forth in FIGS. 2 and 6 with the supported structure omitted.

FIG. 8 is a top plan view of the form of the invention set forth in FIGS. 2, 6 and 7.

DESCRIPTION OF THE PREFERRED EMBODIMENTS OF THE INVENTION [1]

Figure 9:
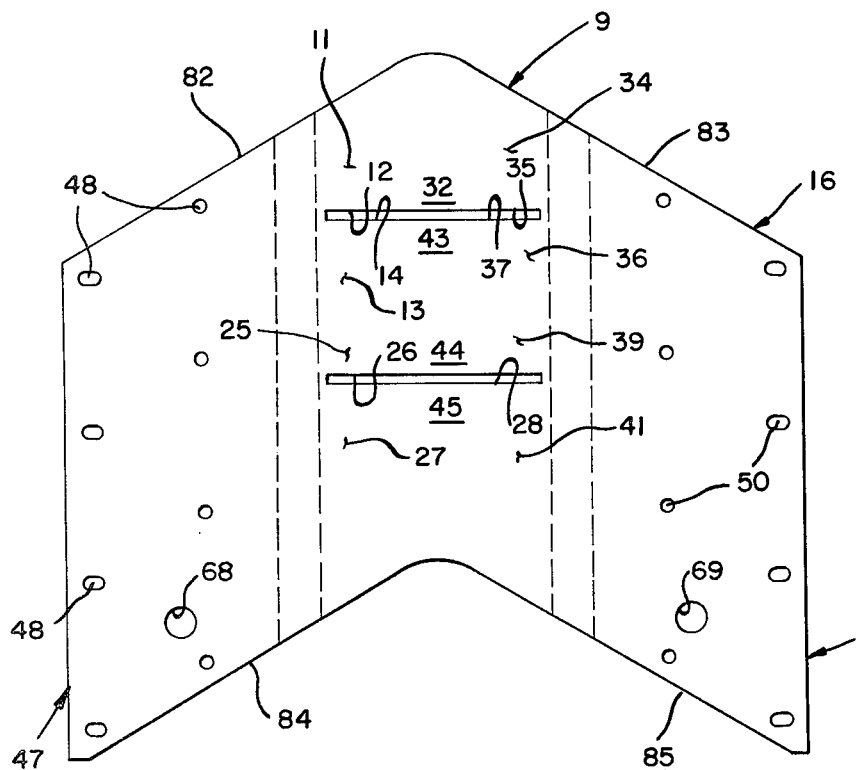
FIG. 9 is a plan view of a supported member prior to bending to the form shown in FIGS. 1, 3, 4, and 5.
Figure 12:
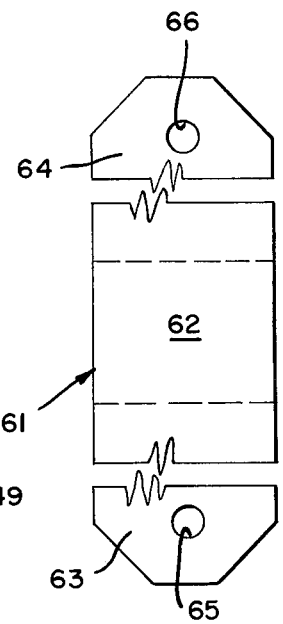
FIG. 12 is a plan view of a U-shaped seat member prior to bending to the form shown in FIG. 2.
Figure 11:
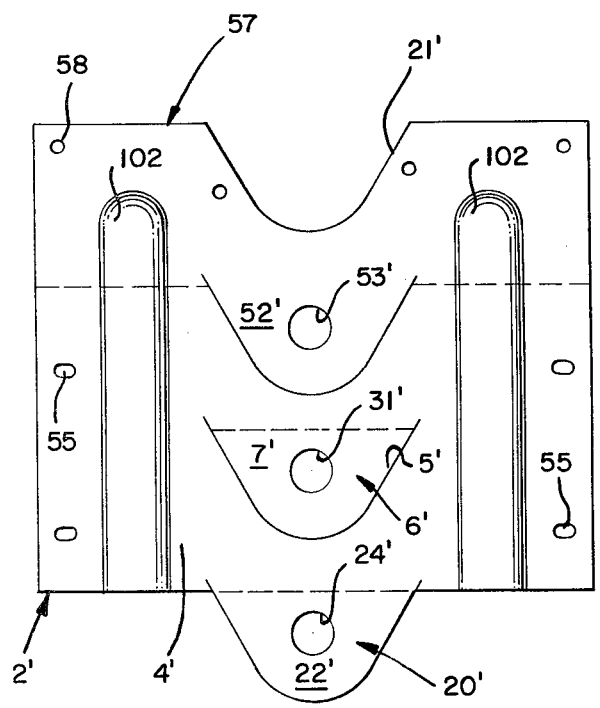
FIG. 11 is a plan view of a supporting member prior to bending to the form shown in FIG. 2.

The infinite skewed hanger of the present invention consists of a supporting member 2 adapted for connection to a supporting structure 3 and has a face element 4 positioned generally in a vertical plane. A first tab element 6 is formed from a portion 5 of the face element and extends therefrom in a generally horizontal plane and has an upper surface 7 and a lower surface 8. A supported gusset-like member 9 includes a first gusset-like projection 11 positioned above the tab element and extends toward the face element in close proximity thereto and has an edge 12 in close fitting sliding registration with the upper surface of the first tab element. A second gusset-like projection 13 is positioned below the tab element and extends toward the face element in close proximity thereto and has an edge 14 in close fitting sliding registration with the lower surface 8 of the first tab element. Connection means 16 is connected to the supported gusset-like member 9 and is adapted for connection to a supported structure 17. A pivot means 18 is pivotally connected to the supporting member 2 and the supported gusset-like member 9.

[1] In the description of the invention, the first modified form of the invention is indicated by the identical number, followed by a prime mark ('). The second modified form is identified by a double prime mark ("). The third modified form of the invention is indicated by a triple prime mark ('''). The fourth modified form is indicated by four prime marks ('''').
In the claims no prime marks are used since all modified elements are patent equivalents.

Where structural design loads require it, a second tab element 20 is formed from another portion 21 of the face element and is located below the first tab element 6 and extends in a generally horizontal plane and has an upper surface 22, a lower surface 23, and an opening 24 therethrough. A third gusset-like projection 25 is formed in the supported gusset-like member 9 and is located below the second gusset-like projection 13 and extends toward the face element 4 in close proximity thereto and has an edge 26 in close fitting sliding registration with the upper surface 22 of the second tab element 20.

A fourth gusset-like projection 27 may be formed in the supported gusset-like member 9 and is located below the third gusset-like projection 25 and extends toward the face element 4 in close proximity thereto and has an edge 28 in close fitting sliding registration with the lower suface 23 of the second tab element 20.

The pivot means 18 may consist of an elongated cylindrical pin. To accommodate the pin, the first tab element 6 is formed with an opening 31 therethrough which is dimensioned to receive the cylindrical pin in close fitting sliding engagement. The supported gusset-like member 9 includes a cylindrical pin engaging portion 32 which extends from at least one of the gusset-like projections for pivotally engaging the cylindrical pin.

The infinite skewed hanger of the present invention may also have a fifth gusset-like projection 34 formed in the supported gusset-like member which is connected to the first gusset-like projection 11 and is positioned at an angle thereto and has an edge 35 in close fitting sliding registration with the upper surface of the first tab element 6. A sixth gusset-like projection 36 may also be formed in the supported gusset-like member 9 and be connected to the second gusset-like projection 13 and be positioned at an angle thereto and have an edge 37 in close fitting sliding registration with the lower surface of the first tab element 6.

The infinite skewed hanger of the present invention may also have a seventh gusset-like projection 39 formed in the supported gusset-like member 9 and be connected to the third gusset-like projection 25 and be positioned at an angle thereto. The seventh gusset-like projection 39 may have an edge 40 in close fitting sliding registration with the upper surface 22 of the second tab element 20. An eighth gusset-like projection 41 may be formed in the supported gusset-like member 9 and be connected to the fourth gusset-like projection 27 and be positioned at an angle thereto. The eight gusset-like projection 41 has an edge 42 in close fitting sliding registration with the lower surface 23 of the second tab element 20.

In the preferred form of the invention, as previously stated, the pivot means is an elongated cylindrical pin 18. The first and fifth gusset-like projections 11 and 34 are connected together and engage the pin so that the supported gusset-like member 9 cannot be separated from the supporting member 2. The second and sixth gusset-like projections 13 and 36 are connected together at a pin engaging portion 43 and also engage the cylindrical pin 18. The third and seventh gusset-like projections 25 and 39 may also be connected together at a pin engaging portion 44 and engage the cylindrical pin. Finally, the fourth and eighth gusset-like projections 27 and 41 may be connected together at a pin engaging portion 45 and engage the cylindrical pin 18.

As illustrated in the drawings, the connection means includes a first hanger side member 47 which is formed with fastener openings 48. The first hanger side member 47 is connected to the first, second, third and fourth gusset-like projections 11, 13, 25, and 27. The connection means may also include a second hanger side 49 formed with fastener openings 50. The second hanger side member is connected to the fifth, sixth, seventh and eighth gusset-like projections 34, 36, 39, and 41.

As illustrated in FIGS. 1, 3, 4, 5, 9, and 10, the supporting member 2 may be formed with a top tab member 52 connected to the face element 4 which extends horizontally therefrom toward the supported gusset-like member 9 and is formed with an opening 53 in alignment with the openings in the first and second tab members 6 and 20. The pin 18 may also be formed with a head member 54 for resting on the top member 52 to prevent separation of the pin from the supporting member 2. Fastener openings 55 are formed in face element 4 for attachment to supporting structure 2.

Referring to FIGS. 2, 6, 7, 8, 11 and 12 another form of the invention is illustrated in which the supporting member 2' is formed with a top flange member 57 connected to the face element 4' and is formed with fastener openings 58 adapted for attachment to the supporting structure 3.

Figures 13, 14:
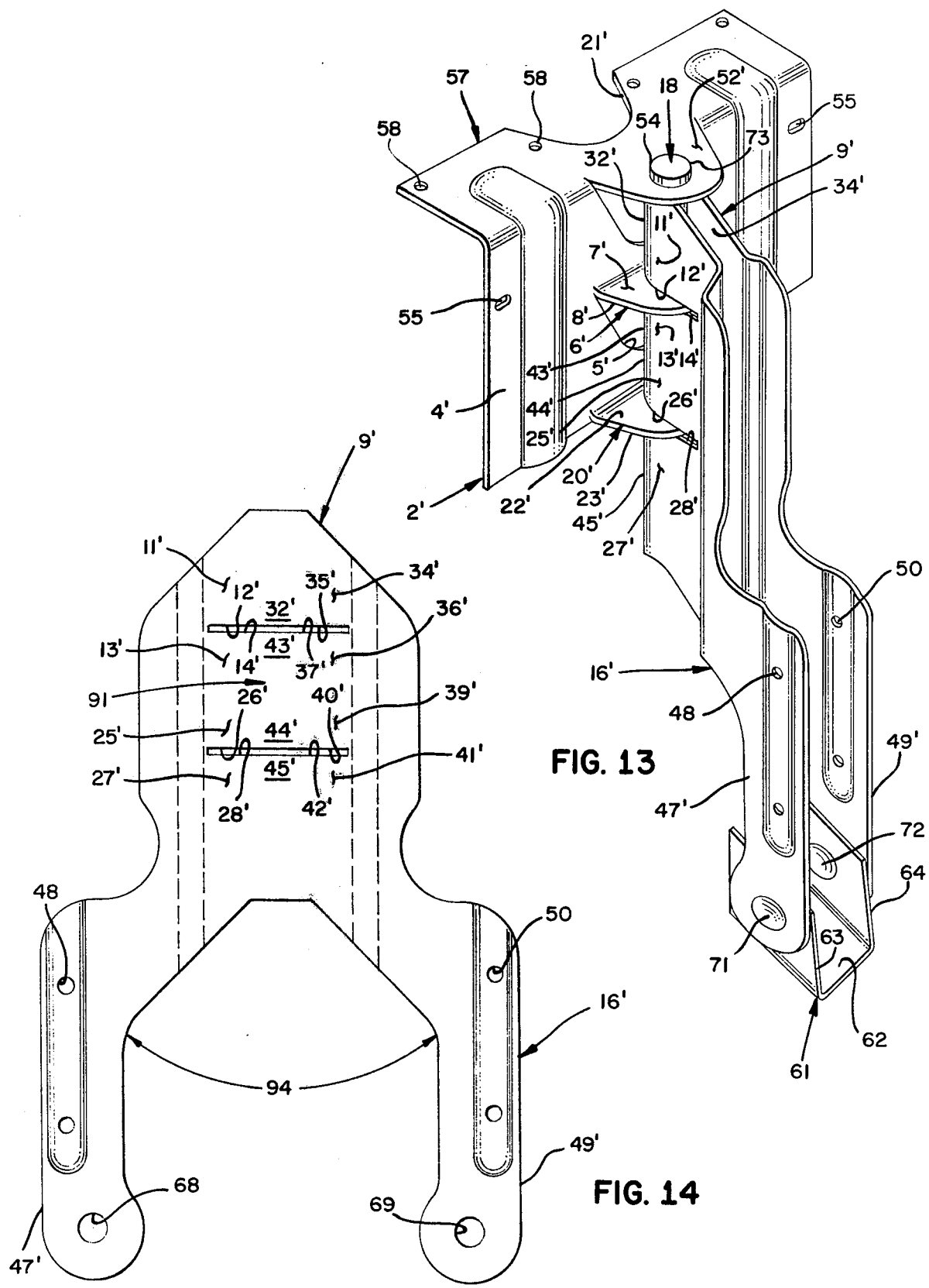
FIG. 13 is a perspective view of another form of supported member.
FIG. 14 is a plan view of the supported member illustrated in FIG. 13 prior to bending.

Still another form of the invention is illustrated in FIGS. 13 and 14. A U-shaped seat member 61 having a seat element 62 and upstanding leg elements 63 and 64 integrally connected to the seat element and formed with openings 65 and 66 is connected to first and second hanger side members 47' and 49' at openings 68 and 69 in the hanger side member. Seat pins 71 and 72 dimensioned for registration with the U-shaped seat member openings and the first and second hanger side openings provide a pivotal connection.

Figure 15:
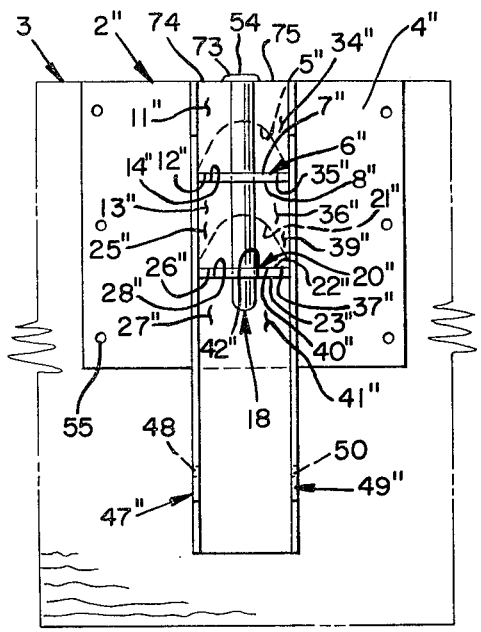
FIG. 15 is a front elevation view of still another form of the presented invention attached to a supporting structure.
Figure 16:
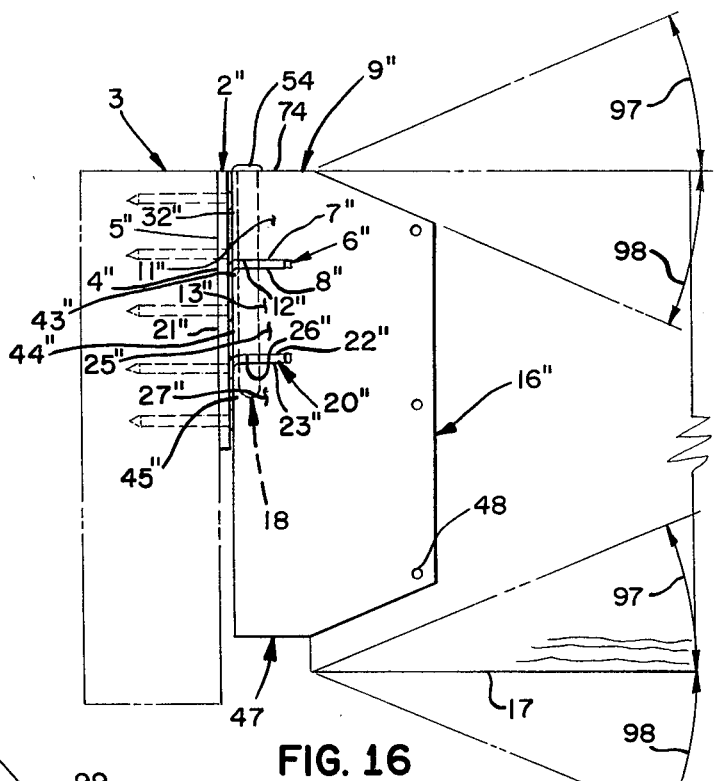
FIG. 16 is a side elevation view of the invention illustrated in FIG. 15 holding a supported structure.
Figure 17:
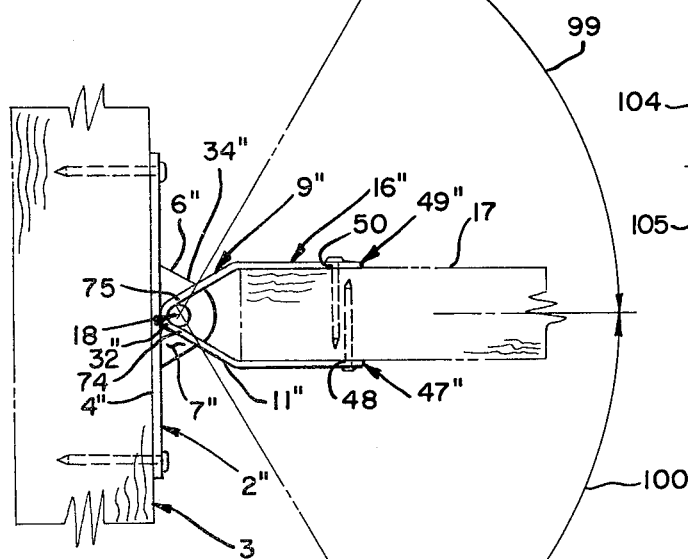
FIG. 17 is a top plan view of the form of the invention illustrated in FIGS. 15 and 16.

FIGS. 15-17 illustrate another form of the invention. Pin 18 is formed with a head 54 having a shoulder 73. The first and fifth gusset-like projections 11" and 34" are positioned adjacent to the pin and the gusset-like projections are formed with a top edge 74 and 75 for receiving the shoulder on the pin head to prevent separation of the pin from the supporting member 2" and the supported gusset-like member 9".

Figure 18:
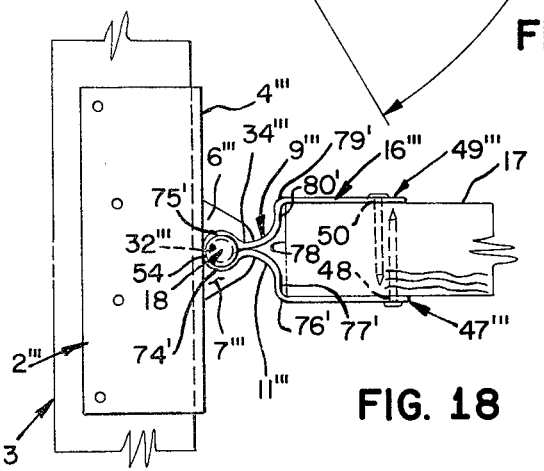
FIG. 18 is a top plan view of still another form of the invention attached to a supporting structure and holding a supported structure.

As shown in FIGS. 8 and 18, the connection means 16 or 16''' are formed with a right angular bend 76 or 76' providing a face portion element 77 or 77' adapted for abutment of the end 78 of the supported structure 17. For more precise end abutment, the connection means may be formed with a second right angular bend 79 or 79' forming a second face portion element 80 or 80'.

FIG. 9 illustrates a form of the invention in which the supported gusset-like member 9 and the connection means 16 are formed from a planar sheet metal member having a chevron-like shape prior to bending. After bending top edges 82 ad 83 and bottom edges 84 and 85, the connection means assume a downward slope adapted for carrying the supported structure 17 on a downward slope.

Figure 10:
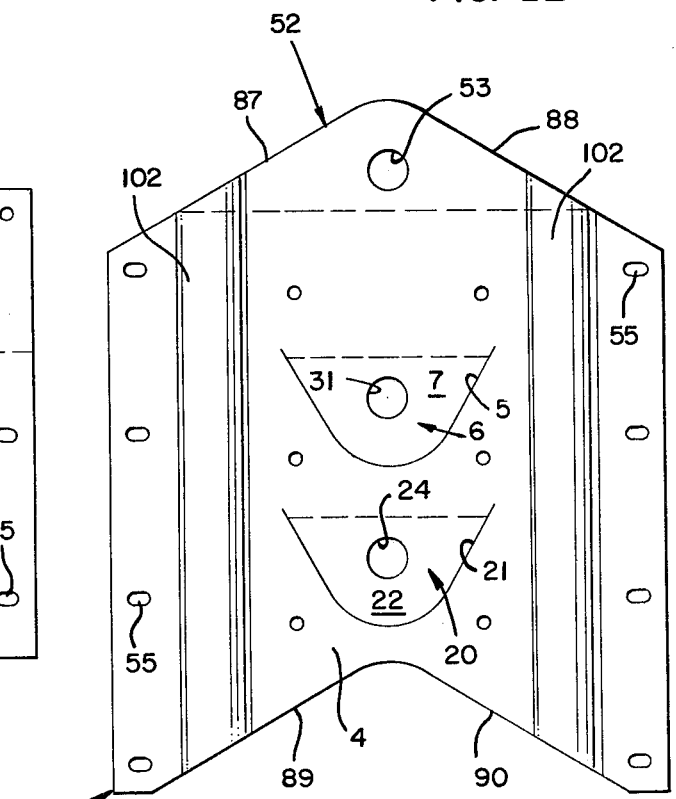
FIG. 10 is a plan view of a supporting member illustrated in FIGS. 1, 3, 4 and 5 prior to bending to the form shown in FIG. 1.

FIG. 10 illustrates a form of the invention in which the supporting member 2 is formed from a planar sheet metal member having a chevron-like shape so that the supporting member can be mounted on a sloping supporting structure. Top edges 87 and 88 and bottom edges 89 and 90 are cut on a slope at an angle which will conform to the slope of the supporting structure.

FIG. 18 illustrates another form of the invention in which the supported gusset-like member 9''' encapsulates the pivot means. The head 54 of the pin rests on the top edges 74' and 75' of the gusset-like member 9. The connection means 16''' encapsulates the end 78 of the supported structure 17.

FIGS. 13 and 14 illustrate another form of the invention. The supported gusset-like member 9' and the connection means 16' are formed from a planar sheet metal member in a generally A-shape comprising an upper body member 91 forming the gusset-like member and the lower legs 47' and 49' from the hanger side members of the connection means. The supported gusset-like member 9' and the connection means 16' are dimensioned and formed so that the part may be formed on a continuous die cutting machine from a continuous metal strip in which the upper body member 91 of one piece forms the cut-out section 94 of the succeeding piece of the continuous metal strip.

Fastener openings 48 and 50 in the supported gusset-like member and fastener openings 55 in the supporting member may be circular as in all standard connectors. Since, however, the supported gusset-like member may be rotated into close association with either side of the supporting member, it may be difficult or even impossible to drive a nail into the opening when the supported structure is in place. It is therefore preferable that some or all of the openings 48, 50 and 55 be formed in a slotted shape as illustrated in the drawings and as fully described in my co-pending U.S. patent application entitled RESTRICTED SLOT NAIL OPENINGS FOR SHEET METAL FRAMING CONNECTORS, Ser. No. 084,722 Filed: Oct. 15, 1979 executed on Oct. 11, 1979 and mailed to the United States Patent and Trademark Office on Oct. 12, 1979. As previously described in the above set forth application, the restricted slot opening is formed with a width slightly larger than the diameter of the nail fastener and has a length greater than the diameter of the nail so that when the nail is inserted through the opening at the selected angle, the diagonally opposed outer edges of the sides of the opening tangentially register with the opposed sides of the fastener and relative movement between the nail fastener and the connector is prevented.

Use of the infinite skewed hangers is as follows. Reference is first made to the form of the invention illustrated in FIGS. 1, 3-5, 9 and 10.

Since supporting member 2, supported gusset-like member 9 and pin 18 are separable parts, several construction alternatives are available. First, the parts may be separated and supporting member 2 may be fastened to supporting structure 3 by nail fasteners 96. Next, the pin and supported gusset-like member 9 may be assembled and the supported structure 17 may be placed within the connection means and fastened thereto or the supported structure may be fastened to the supported gusset-like member 9 and then raised into place and the pin 18 inserted as the last step in assembling the infinite skewed hanger.

Another alternate construction is to preassemble the infinite skewed hanger, fasten supported structure 17 to the infinite skewed hanger and then lift the entire assembly into place where it is connected to the supporting structure 3.

As shown in FIG. 3, the supported structure 17 may be fastened to the connection means 16 at any sloped angle as shown by double arrows 97 and 98. This angle may commonly vary from the horizontal, either up or down by an angle of 30°.

FIG. 5 illustrates the manner in which the supported gusset-like member 9 may be skewed either right or left as illustrated by double arrows 99 and 100. The amount of skew may commonly vary up to 60° either right or left and at any angle therebetween. Unlike a hinge whose structure and function is to repeatedly rotate, the structure of the present invention is not designed to rotate after load has been imposed. In fact, the friction set up within the infinite skewed hanger is so great that after load has been imposed, it is virtually impossible to rotate the separable parts with respect to one another. As one can readily appreciate, edge 12 and edge 26 bear against first tab surface 27 and second tab surface 23 with incredibly high force and the friction therebetween prevents any movement as long as load is imposed or unless an incredibly high horizontal force is imposed.

Adjustment of horizontal angle is possible after the supported structure has been attached but before load is imposed.

After the supported structure and skewed hanger has been attached to the supporting structure, it is possible to remove pin 18 and lift the supported structure away from the supporting member without unfastening the supported member 2 from the supporting structure 3 or unfastening the connecting means 16 from the supported structure 17.

The form of the invention illustrated in FIGS. 2, 6–8, 11 and 12 differs from the first form of the invention in two ways. First, the supporting member 2' is formed with a top flange member 57 which may be attached to the top surface of a supporting structure 3, and secondly, a U-shaped seat member may be attached to the connecting means 16. It is not essential that the alternate supporting member and U-shaped seat be used in conjunction. The two modifications are merely illustrated in this manner to reduce redundancy in the drawings. The top flange member 57 gives greater holding strength. Embossments 102 give added rigidity to the supporting member 2' where load requirements require them.

The alternate form of the invention illustrated in FIGS. 13 and 14 show a modified connection means 16' which operates in the same manner previously described but results in a reduction of weight and an economy in production by using progressive dies as previously described. The connection means 16' may be used with or without the U-shaped seat member 61.

The form of the invention set forth in FIGS. 15–17 operates in principle the same as the previously described infinite skewed hangers. FIG. 16 indicates the angles at which the supported structure may be attached above and below the horizontal by double arrows 97 and 98. FIG. 15 indicates the horizontal angle that the supported gusset-like member 9" may be skewed either right or left as indicated by arrows 99 and 100.

FIG. 18 illustrates still another configuration that may be given to the supported gusset-like member 9'''. As previously described, the right angle bends 76 and 79 provide a right angular abuttment for end 78 of supported structure 17. This feature eliminates the need for angled cuts of the end of the supported structure as required by other custom made skewed connectors.

Figure 19:
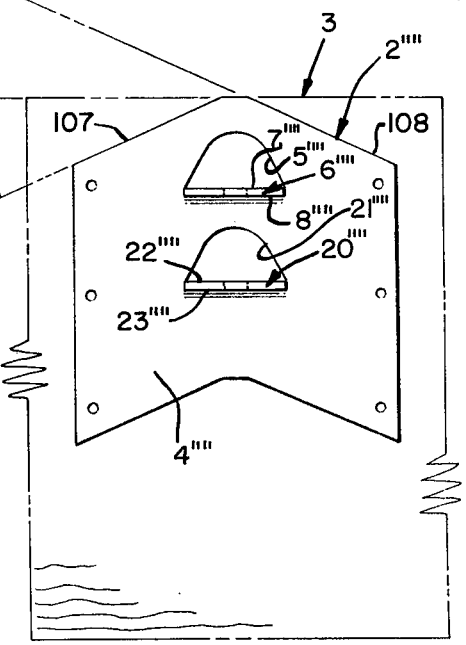
FIG. 19 is a front elevation view of still another form of supporting member which may be used with the supported members illustrated in either FIGS. 15-17 or FIG. 18.

FIG. 19 illustrates another form of supporting member 2''''. As previously described, the chevron shape permits the supporting member to be mounted on supporting structures 3 which are sloped as indicated by the double arrows 104 and 105. Top edges 107 and 108 may be cut so that the construction workers can line up one of the top edges with the sloping top edge of the supporting structure 3.

It may also be seen by comparing tabs 6'''' and 20'''' in FIG. 19 with tabs 6 and 20 as shown in FIG. 10 that the tabs may be bent upwardly or downwardly. Either way, the loads imposed on the supporting members 2 and 2'''' are imposed in shear rather than by bending of the tabs. This load shear is carried to the face element 4, not through the pivot connecting pin 18.

As one example of the above invention, load tests showed that the average ultimate load which could be supported by a universal skewed hanger similar to the one illustrated in FIG. 2 was 4040 pounds. These hangers were capable of carrying 2×8, 2×10, 2×12, and 2×14 joist members. The face element had a size of 6"×3¼" and a top flange of 1¾"×6". The material used was 16 ga. galvanized steel. The connector pin was ½"×4".

Other hangers built of heavier guage material have withstood a 10,000 lb. test. The primary fact is that the universal skewed hanger of the present invention is not limited to any particular size or carrying capacity.

I claim:
1. An infinite skewed hanger comprising:
  a. a supporting member 2 adapted for connection to a supporting structure 3 and having a face element 4 positioned generally in a vertical plane;
  b. a first tab element 6 formed from a portion 5 of said face element extending therefrom in a generally horizontal plane having an upper surface 7 and a lower surface 8;
  c. a supported gusset-like member 9 including:
    1. a first gusset-like projection 11 positioned above said first tab element 6 and extending toward said face element 4 and having a surface in close proximity thereto and having an edge 12 in close fitting pivotal sliding registration with said upper surface 7 of said first tab element 6 and having a portion extending beyond the end of said tab element 6;
    2. a second gusset-like projection 13 positioned below said first tab element 6 and extending toward said face element 4 and having a surface in close proximity thereto and having an edge 14 in close fitting pivotal sliding registration with said lower surface 8 of said first tab element 6 and having a portion extending beyond the end of said tab element 6;
  d. connection means 16 connected to said supported gusset-like member adapted for connection to a supported structure;
  e. pivot means 18 pivotally connecting said supporting member and said supported gusset-like member; and
  f. said portions of said first and second gusset like projections extending beyond said end of said tab are integrally connected together and cooperate to cause loads carried by said connection means 16 to be carried by said first tab element 6 primarily in shear rather than bending moment.

2. An infinite skewed hanger as described in claim 1 comprising:
   a. a second tab element 20 formed from another portion 21 of said face element located below said first tab element extending in a generally horizontal plane and having an upper surface 22 and a lower surface 23;
   b. a third gusset-like projection 25 formed in a said supported gusset-like member located below said second gusset-like projection and extending toward said face element and having a surface in close proximity thereto and having an edge 26 in close fitting pivotal sliding registration with said upper surface of said second tab element and having a portion extending beyond the end of said tab element 20;
   c. a fourth gusset-like projection 27 formed in said supported gusset-like member located below said third gusset-like projection and extending toward said face element and having a surface in close proximity thereto and having an edge 28 in close fitting pivotal sliding registration with said lower surface of said second tab element and having a portion extending beyond the end of said tab element 20; and
   d. said portions of said third and fourth gusset-like projections extending beyond said end of said tab are integrally connected together and are integrally connected to said second gusset-like projection extending beyond said end of said first tab and cooperate to cause loads carried by said connection means 16 to be carried by said first and second tab elements primarily in shear rather than bending moment.

3. An infinite skewed hanger as described in claim 1 comprising:
   a. said pivot means is an elongated cylindrical pin;
   b. said first tab element is formed with an opening 31 therethrough dimensioned to receive said cylindrical pin in close fitting sliding engagement; and
   c. said supported gusset-like member includes a cylindrical pin engaging portion 32 extending from at least one of said gusset-like projections for pivotally engaging said cylindrical pin.

4. An infinite skewed hanger as described in claim 1 comprising:
   a. a fifth gusset-like projection 34 formed in said supported gusset-like member positioned above said first tab element 6 and extending toward said face element 4 and having a surface in close proximity thereto and connected to said first gusset-like projection and positioned at an angle thereto and having an edge 35 in close fitting pivotal sliding registration with said upper surface of said first tab element and having a portion extending beyond the end of said first tab element 6;
   b. a sixth gusset-like projection 36 formed in said supported gusset-like member positioned below said first tab element 6 and extending toward said face element 4 and having a surface in close proximity thereto and connected to said second gusset-like projection and positioned at an angle thereto and having an edge 37 in close fitting pivotal sliding registration with said lower surface of said first tab element and having a portion extending beyond the end of said first tab element 6; and
   c. said portions of said fifth and sixth gusset-like projections extending beyond said end of said first tab are integrally connected together and cooperate to cause loads carried by said connection means 16 to be carried by said first tab element 6 primarily in shear rather than bending moment.

5. An infinite skewed hanger as described in claim 2 comprising:
   a. a fifth gusset-like projection 34 formed in said supported gusset-like member positioned above said first tab element 6 and extending toward said face element 4 and having a surface in close proximity thereto and connected to said first gusset-like projection and positioned at an angle thereto and having an edge 35 in close fitting pivotal sliding registration with said upper surface of said first tab element and having a portion extending beyond the end of said first tab element 6;
   b. a sixth gusset-like projection 36 formed in said supported gusset-like member positioned below said first tab element 6 and extending toward said face element 4 and having a surface in close proximity thereto and connected to said second gusset-like projection and positioned at an angle thereto and having an edge 37 in close fitting pivotal sliding registration with said lower surface of said first tab element and having a portion extending beyond the end of said first tab element 6;
   c. said portions of said fifth and sixth gusset-like projections extending beyond said end of said first tab are integrally connected together and cooperate to cause loads carried by said connection means 16 to be carried by said first tab element 6 primarily in shear rather than bending moment;
   d. a seventh gusset-like projection 39 formed in said supported gusset-like member located below said sixth gusset-like projection and extending toward said face element and having a surface in close proximity thereto and connected to said third gusset-like projection and positioned at an angle thereto and having an edge 40 in close fitting sliding registration with said upper surface of said second tab element and having a portion extending beyond the end of said tab element 20;
   e. an eighth gusset-like projection 41 formed in said supported gusset-like member located below said seventh gusset-like projection and extending toward said face element and having a surface in close proximity thereto and connected to said fourth gusset-like projection and positioned at an angle thereto and having an edge 42 in close fitting sliding registration with said lower surface of said second tab element and having a portion extending beyond the end of said tab element 20; and
   f. said portions of said seventh and eighth gusset-like projections extending beyond said end of said tab are integrally connected together and are integrally connected to said second gusset-like projection extending beyond said end of said first tab and cooperate to cause loads carried by said connection means 16 to be carried by said first and second tab elements primarily in shear rather than bending moment.

6. An infinite skewed hanger as described in claim 5 comprising:
   a. said pivot means is an elongated cylindrical pin;

b. said first and second tab elements are formed with openings therethrough dimensioned to receive said cylindrical pin in close fitting sliding engagement;

c. said first and fifth gusset-like projections are connected together and engage said cylindrical pin at a pin engaging portion 32 so that said supported gusset-like member cannot be separated from said supporting member;

d. said second and sixth gusset-like projections are connected together at a pin engaging portion 43 and engage said cylindrical pin;

e. said third and seventh gusset-like projections are connected together at a pin engaging portion 44 and engage said cylindrical pin; and f. said fourth and eighth gusset-like projections are connected together at a pin engaging portion 45 and engage said cylindrical pin.

7. An infinite skewed hanger as described in claim 6 wherein:

a. said connection means includes a first hanger side member 47 formed with fastener openings 48 connected to said first, second, third, and fourth gusset-like projections; and b. said connection means includes a second hanger side member 49 formed with fastener openings 50 connected to said fifth, sixth, seventh and eighth gusset-like projections.

8. An infinite skewed hanger as described in claim 7 comprising:

a. said supporting member is formed with a top tab member 52 connected to said face element and extending horizontally therefrom toward said supported gusset-like member and formed with an opening 53 in alignment with said openings in said first and second tab members; and b. said pin is formed with a head member 54 for resting on said top tab member to prevent separation of said pin from said supporting member.

9. An infinite skewed hanger as described in claim 8 comprising:

a. said supporting member is formed with a top flange member 57 connected to said face element and extending horizontally therefrom away from said supported gusset-like member and formed with fastener openings 58 adapted for attachment to said supporting structure.

10. An infinite skewed hanger as described in claim 9 comprising:

a. a U-shaped seat member 61 including a seat element 62 and upstanding leg elements 63 and 64 integrally connected to said seat element and formed with openings 65 and 66 therethrough;

b. said first and second hanger side members are formed with openings 68 and 69 for registration with said U-shaped seat member openings; and c. seat pins 70 and 71 dimensioned for registration with said U-shaped seat member openings and said first and second hanger side openings for pivotally connecting said members.

11. An infinite skewed hanger as described in claim 7 wherein:

a. said pin is formed with a head having a shoulder 73;

b. said first and fifth gusset-like projections are positioned adjacent to said pin and said gusset-like projections are formed with top edges 74 and 75 for receiving said shoulder on said pin head to prevent separation of said pin from said supporting member and said supported gusset-like member; and c. said connection means is formed with a right angular bend 76 providing a face portion element 77 adapted for abuttment of an end 78 of said supported structure.

12. An infinite skewed hanger as described in claim 7 wherein:

a. said supported gusset-like member and said connection means are formed from a planar sheet metal member having chevron-like shape prior to bending thereby assuming a downward sloping general configuration adapted for carrying said supported structure on a downward slope.

13. An infinite skewed hanger as described in claim 1 wherein:

a. said supporting member is formed from a planar sheet metal member having a chevron-like shape so that said supporting member can be adapted for mounting on a sloping supporting structure.

14. An infinite skewed hanger as described in claim 1 wherein:

a. said supported gusset-like member encapsulates said pivot means; and b. said connection means encapsulates the end of said supported structure.

15. An infinite skewed hanger as described in claim 1 wherein:

a. said supported gusset-like member and said connection means are formed from a planar sheet metal member in a generally A-shape comprising an upper body member 91 forming the gusset-like member and the lower legs 47 and 49 forming the connection means; and b. said supported gusset-like member and said connection means are dimensioned and formed so that said part may be formed on a continuous die-cutting machine from a continuous metal strip in which said upper body member of one piece forms the cut-out section 94 of the succeeding piece of said continuous metal strip.

16. An infinite skewed hanger as described in claim 1 comprising:

a. said connection means is formed with a plurality of restricted slot openings adapted for connecting said connection means to said supported structure; and b. a plurality of fasteners having shanks with a uniform diameter and heads having a diameter greater than the diameters of said shanks adapted for being driven into said supported structure; and c. said restricted slot openings are formed with a width slightly larger than the diameter of said fasteners and are formed with a length greater than the diameters of said fasteners so that when said fasteners are inserted through said restricted slot openings at an angle the diagonally opposed outer edges of the sides of said restricted slot opening tangentially register with opposed sides of said fastener and relative movement between said nail fastener and said connection means is prevented.

* * * * *